May 30, 1961  R. E. LODERHOSE  2,986,325

PHONOGRAPH JACKET AND METHOD OF MAKING SAME

Filed Feb. 29, 1960  3 Sheets-Sheet 1

INVENTOR.
Richard E. Loderhose
BY
Irving Seidman
ATTORNEY

May 30, 1961 R. E. LODERHOSE 2,986,325
PHONOGRAPH JACKET AND METHOD OF MAKING SAME
Filed Feb. 29, 1960 3 Sheets-Sheet 2
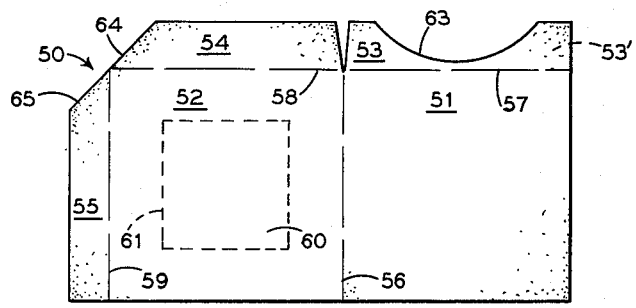
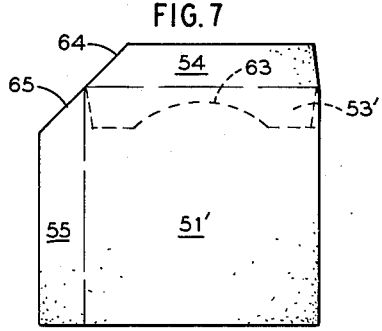
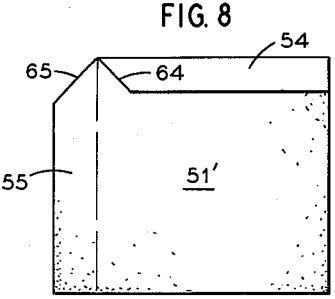
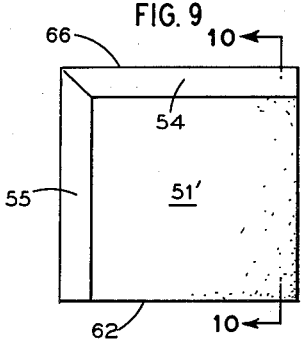
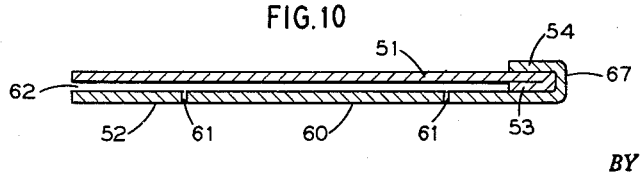
*INVENTOR.*
Richard E. Loderhose
BY
ATTORNEY May 30, 1961 R. E. LODERHOSE 2,986,325
PHONOGRAPH JACKET AND METHOD OF MAKING SAME
Filed Feb. 29, 1960 3 Sheets-Sheet 3
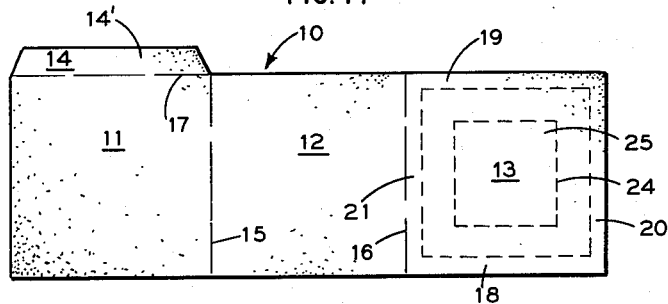
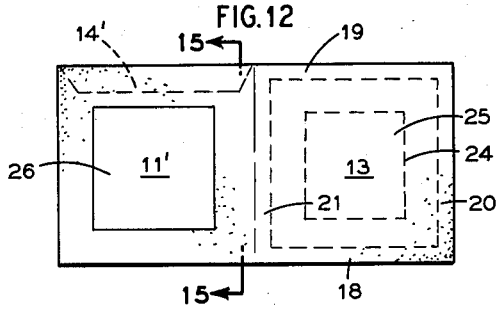
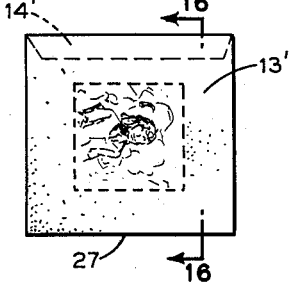
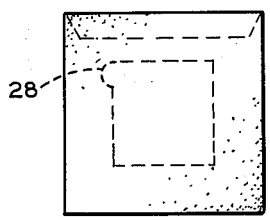
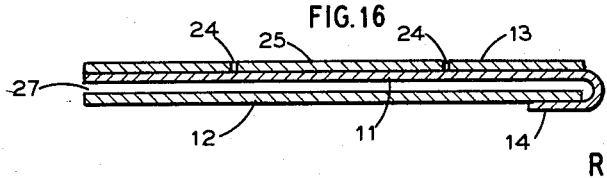
INVENTOR.
Richard E. Loderhose
BY
Irving Seidman
ATTORNEY

2,986,325
PHONOGRAPH JACKET AND METHOD OF MAKING SAME
Richard E. Loderhose, 84—25 Radnor St., Jamaica Estates, N.Y.
Filed Feb. 29, 1960, Ser. No. 11,520
7 Claims. (Cl. 229—68)

This invention relates to phonograph record jackets or envelopes and, more particularly, to novel record jackets or envelopes having on the face thereof an easily detachable picture.

This invention also relates to inexpensive rapid methods of manufacturing the aforesaid record jackets.

The jackets or envelopes of many records comprise an essentially square envelope of cardboard or the like covered with one or more layers of paper glued thereto, the outer layer of paper being "slick" paper, i.e. having a glossy finish. This outer layer is imprinted, in black and white or in color, with information including the title or titles of the recordings on the record. Quite frequently, this outer layer is imprinted with the picture of the recording group or the individual artist, and sometimes the artists' picture carries an autograph.

It so happens that fans, particularly in the younger age groups, collect pictures of their favorite recording stars, especially where these pictures carry an autograph of the star. As a result, it is a quite common expedient to cut or otherwise remove such pictures from a record jacket or envelope. As the outer layer of glossy paper imprinted with the picture is firmly adhered to the underlying material of the record jacket, it is difficult to remove the picture intact from the jacket and, when removal of this type is attempted, the picture may be torn or otherwise damaged. Consequently, the more common expedient is to cut the picture carrying section out of the wall of the jacket, thus leaving a relatively large opening exposing a record placed in the jacket. From the standpoint of record protection, this procedure destroys the usefulness of the record jacket.

In accordance with the present invention, these difficulties are avoided and the record protecting integrity of the jacket is maintained by providing a picture section of the outer panel of the jacket, which section is not adhered to the underlying material of the jacket but is attached along perforated tear lines to marginal portions of the outer panel. As removal of the picture section would create a large unsightly opening in the panel and expose the phonograph jacket, a middle panel is provided to which the marginal edges of the outer panel are adhered, which middle panel carries a picture or printed matter disposed directly beneath the removable picture section. Thereby, when the picture of the outer panel is removed, the jacket will still function to protect the phonograph record within it and the appearance of the jacket will remain substantially unchanged.

In one form of this invention, a single blank is so folded that a five layer spine or stiffened portion is provided, the outer edge of which may be used for printing the title, artist, manufacturer's catalogue number, etc., so that in vertical position on a shelf, the spine edge of the jacket bearing such title, etc. is readily visible.

In another form, a single blank is so folded that a four layer spine or stiffened portion is provided, the outer edge of which may be used for the same purpose as above stated for the five layer spine.

For a fuller understanding of the invention principles, reference is made to the following description of typical embodiments thereof as illustrated in the accompanying drawings. In the drawings:

Fig. 6 is a plan view of a modified jacket showing the inside of a die-cut blank for making a phonograph jacket.

Fig. 7 is a plan view of the blank shown in Fig. 6 with the rear panel folded upon the front panel.

Fig. 8 is the same plan view as that shown in Fig. 7 except that the flap 54 has been glued to the rear panel.

Fig. 9 is a plan view of the rear or back of the completed jacket with both the outer flaps glued to the rear panel.

Fig. 10 is a sectional view on line 10—10 of Fig. 9.

Fig. 11 is a plan view of another modified jacket showing the inside of a die-cut blank for making a phonograph jacket.

Fig. 12 is a plan view of the blank shown in Fig. 11 with the middle panel folded upon the rear panel.

Fig. 13 is a plan view of the completed jacket, shown in Fig. 11, showing the tear outline and removable picture section.

Fig. 14 is a plan view of the completed jacket, shown in Fig. 11, showing the starter tab of the removable picture section.

Fig. 15 is a sectional view on line 15—15 of Fig. 12.

Fig. 16 is a sectional view on line 16—16 of Fig. 13.

Figure 1:
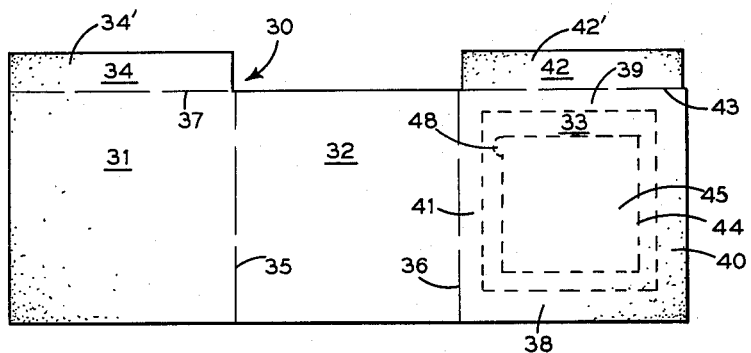
Fig. 1 is a plan view showing the inside of a die-cut blank for making a phonograph record jacket and showing fold or crease lines, flaps and a perforated removable picture section.

Referring to Figs. 1 to 5 of the drawings, numeral 30 represents a die-cut cardboard blank comprised of three substantially square panels 31, 32, 33, an inner flap 34 extending from the side edge of panel 31 and an outer flap 42 extending from the side edge of panel 33, panel 33 being designated as the front panel, 32 the rear panel and 31 the middle panel. The panels are divided by crease lines 35 and 36; flap 34 is divided from the side edge of middle panel 31 by crease line 37, and flap 42 is divided from the side edge of front panel 33 by crease line 43. The front panel 33 is provided with a removable picture section 45 defined by a perforated tear outline 44. At the time the blank 30 is cut, the crease lines 35, 36, 37 and 43 and the tear lines 44 are made simultaneously.

The cardboard blank of Fig. 1 is shown with the "unfinished" side up, the opposite side being of a "finished" surface and imprinted with any desirable lettering and/or pictures, either black and white, colored or both. The "finished" surface may be of "slick" or glossy paper in surface-to-surface adhering contact to the cardboard, if desired.

The envelope or jacket is formed by first applying glue simultaneously to the inside surface 34' of flap 34, the inside surface 42' of flap 42 and the marginal edges 38, 39, 40, 41 on the back or inside of front panel 33 with a glue pot having wheels or rollers. The width of the marginal glue portions 38, 39, 40, 41 may be varied in width and location to correspond to the width and location of the removable picture section 45 of front panel 33. To allow easy removal of section 45, the gluing or pasting portion should terminate parallel to and be spaced a suitable distance to tear lines 44.

Figure 2:
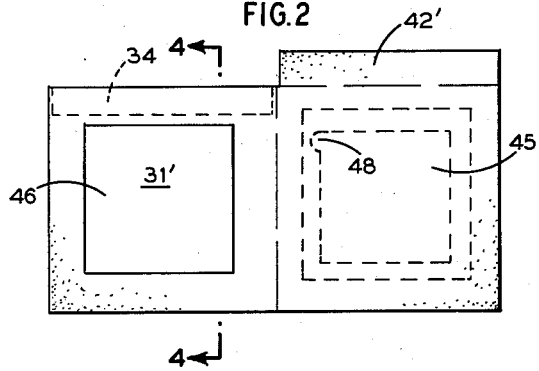
Fig. 2 is a plan view of the blank shown in Fig. 1 with the end of middle panel folded upon the central or rear panel and showing the flap of the middle panel folded upon itself and between the middle panel and rear panel.

The flap 34 is then folded inwardly upon and posted to middle panel 31. Glue is then applied to the outside of flap 34. The partially folded blank then moves along the gluing machine to a position or station where the middle panel 31, with glued flap 34, is folded upon the inside of rear panel 32 so that flap 34 adheres to the marginal edge of rear panel 32, as shown in Fig. 2.

Figure 3:
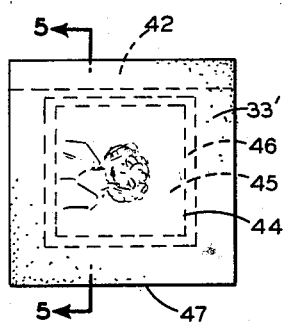
Fig. 3 is a plan view of the completed jacket showing the tear outline and removable picture section.
Figure 4:
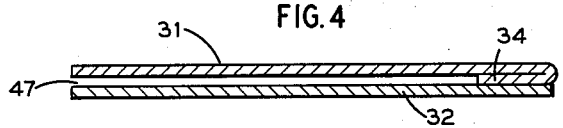
Fig. 4 is a sectional view on line 4—4 of Fig. 2.

The partially folded blank then moves further along the gluing machine to a position where the front panel 33 is folded inwardly and upon the outer face 31' of middle panel 31 by a push-over device or belts so that the glued marginal edges 38, 39, 40, 41 adhere to finished face 31' of the middle panel 31. The glued outer flap 42' is then depressed and folded upon and adhered to the finished face 32' of rear panel 32, as shown in Fig. 3, by pressure rollers or a combination of belts. This is accomplished while the blank is moving continuously on the gluing machine. Fig. 2 shows the "finished" side or face 31' of middle panel 31 overlying the "unfinished" or inside of rear panel 32.

The "finished" face 31' of middle panel 31 has been imprinted with a picture within the outline 46 and is somewhat larger in area than picture section 45 which has the printed picture or pictures of the recording artist or artists, and may have one or more autographs, or may be merely imprinted with the titles of the songs and names of the recording artist or artists for the purpose as hereinafter described. It should be noted that after the front panel 33 is glued to middle panel 31, as shown in Fig. 3, the removable picture section 45 overlays the outline 46.

The jacket is now complete, being closed on three sides and open on the side opposite the flap 42, as indicated at 47.

The completely folded blank, as shown in Fig. 3, now passes to a pressure or sock roller while being constantly held in its completely folded and approximately square condition to assure proper adhesion of the glue or marginal sections 38, 39, 40, 41 to the outerface portions of face 31' of middle panel 31.

The finished jackets then move into a pressure or canvas device which stacks one or more of such jackets into a pressure section for final drying.

If a person desires to remove the picture section 25, it is a simple matter to lift a corner of section 45 by passing the point of a knife along the perforated tear outline 44 and then lifting picture section 45 gently along tear outline 44. To facilitate such removal of picture section 45, a starter tab 48 may be provided which may be easily lifted with the finger nail to start the removal of the picture section 45 along tear lines 44.

When picture section 45 is removed, the picture or printing within the section 46 of middle panel 31 is exposed and the appearance of the jacket is not altered in a substantial manner nor the usefulness of the jacket destroyed.

Figure 5:
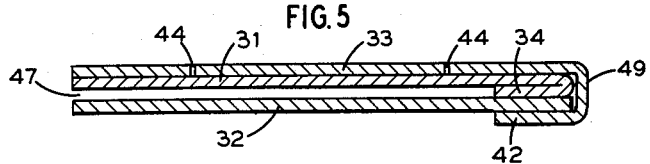
Fig. 5 is a sectional view on line 5—5 of Fig. 3.

It should be noted that when flaps 34 and 42 have been folded and glued into place, as best shown in Fig. 5, a five section lamination results which creates a stiffened or spine portion of the finished jacket. The outer face or edge 49 is a narrow panel extending the entire height of the jacket and may be used for printing the title of the song, name of the artist or performer, insignia or monogram of the manufacturer or producer and the catalogue number of the manufacturer's item.

Referring to Figs. 6 to 10 of the drawings, numeral 50 represents a modified die-cut cardboard blank which is formed into a phonograph jacket and comprises two substantially square panels 51, 52, an inner spine flap 53 and two outer flaps 54, 55. The inner spine flap 53 extends from the back edge of rear panel 51; the outer flap 54 extends from the back edge of front panel 52 and the outer flap 55 extends from the side edge of front panel 52. The panels 51, 52 are divided by a crease line 56; flap 53 is divided from the back edge of rear panel 51 by crease line 57, and outer flaps 54, 55 are divided by crease lines 58, 59 from the back edge and the side edge, respectively, of front panel 52. The front panel 52 is provided with a removable picture section 60 defined by a perforated tear outline 61. At the time the blank 50 is cut, the crease lines 56, 57, 58, 59 and the tear lines 61 are made simultaneously.

The cardboard blank of Fig. 6 is shown with the "unfinished" side up, the opposite side being of a "finished" surface and imprinted with any desirable lettering and/or pictures, either black and white, colored or both. The "finished" surface may be of "slick" or glossy paper in surface-to-surface adhering contact to the cardboard, if desired.

The envelope or jacket is formed by first applying glue simultaneously to the inside faces of flaps 53, 54 and 55. The inner spine flap 53 is then folded inwardly upon and adhered to rear panel 51. The opposite face 53' of flap 53 then has glue applied to it. The rear panel 51 is then folded inwardly upon front panel 52 so that face 53' of flap 53 adheres to the back marginal edge of panel 52, as shown in Fig. 7. It should be noted that flap 53 has an arcuate cut-out portion 63 which is the segment of the arc or circumference of a phonograph record. The flaps 54, 55 are then folded inwardly and downwardly upon the outer face 51' of the rear panel 51 and glued thereto. Fig. 8 shows flap 54 folded and adhered to the outer face 51' of rear panel 51. The inner edges 64, 65 of flaps 54, 55 have been cut at a 45° angle so that when flaps 54, 55 are glued to the rear panel, the corner will be mitered and flaps 54, 55 will be flat and on the same plane.

The finished jacket then moves into a pressure or canvas device which stacks one or more of such jackets into a pressure section for final drying.

It should be noted that after the flaps 53, 54 and 55 have been glued into place, as best shown in Fig. 9, a four section ply or lamination results at the back end 66 of the jacket forming a stiffened or spine portion at such back end 66. The outer or edge 67 is a narrow panel extending the entire height of the jacket and may be used for printing the title of the song, name of the artist or performer, insignia or monogram of the manufacturer or producer and the catalogue number of the manufacturer's item.

When the phonograph record is inserted into the jacket through the open side 62, the inner edge of the phonograph record will abut the arcuate edge 63 of flap 53, thus aiding in positioning the phonograph record within its jacket and saving cardboard since the phonograph record can be inserted further within the jacket.

If a person desires to remove the picture section 60, it is a simple matter to lift a corner of section 60 by passing the point of a knife along the perforated tear outline 61 and then lifting the picture section 60 gently along the tear outline 61. To facilitate such removal of the picture section, a starter tab may be provided, like that shown in Fig. 2 as 48, which may be lifted with the finger nail to initiate the removal of the picture section.

Although the removal of the picture section 60 will mar the outer face of the front panel 52, it will not destroy the jacket since a marginal frame will remain around the panel 52. The jacket will still be in usable condition because a cellophane or paper envelope is usually used to protect the phonograph record against marring and dust.

In the drawings, the flaps 53, 54, 55 have been exaggerated in width for illustrative purposes. However, the width of such flaps may be varied to suit the thickness and type of cardboard used for the jacket.

The method of making the jackets of Figs. 1 to 5, inclusive, and Figs. 6 to 10, inclusive, are very similar to the method described hereinafter for the jacket of Figs. 11 to 16, inclusive.

Referring to Figs. 11 to 16, inclusive, of the drawings, numeral 10 represents a die-cut cardboard blank comprised of three substantially square panels 11, 12, 13 and a flap 14 extending from the side edge of panel 11, panel 13 being designated as the front panel, 12 the rear panel and 11 the middle panel. The panels are divided by crease lines 15 and 16, and the flap 14 is divided from the side edge of panel 11 by crease line 17. The front panel 13 is provided with a removable picture section 25 defined by a perforated tear outline 24. At the time the blank 10 is cut, the crease lines 15, 16, 17 and the tear lines 24 are made simultaneously. The cardboard blank of Fig. 11 is shown with the "unfinished" side up, the opposite side being of a "finished" surface and imprinted with any desirable lettering and/or pictures, either black and white, colored or both. Of course, the "finished" surface may be of "slick" or glossy paper in surface-to-surface adhering contact to the cardboard, if desired.

The envelope or jacket is formed by folding middle panel 11, shown in Fig. 11, onto rear panel 12. Then glue is applied simultaneously to the marginal edges 18, 19, 20, 21 on the back or inside of front panel 13 and to the inside surface 14' of flap 14 with a glue pot having wheels or rollers. The width of the marginal glue portions 18, 19, 20, 21 may be varied in width and location to correspond to the width and location of the removable picture section 25 of front panel 13. To allow easy removal of section 25, the gluing or pasting portion should terminate parallel to and spaced a suitable distance from the tear lines 24.

The partially folded blank then moves along the gluing machine to a position where flap 14 is depressed and folded back and upon and adhered to the finished face of rear panel 12, as indicated in Fig. 12, by pressure rollers or a combination of belts. This is accomplished while the blank is moving continuously. Fig. 12 shows the "finished" side 11' of middle panel 11 overlying the unfinished or inside of rear panel 12.

The "finished" side 11' of middle panel 11 is imprinted with a picture within the outline 26, which is somewhat larger in area than picture section 25, having the picture or pictures of the recording artist or artists, and may have one or more autographs, or may be merely imprinted with the titles of the songs and names of the recording artist or artists for the purpose as will be later described.

As the partially folded blank moves further along the gluing machine, front panel 13 is flipped or folded over by a push-over device or belts so that the glued or unfinished side of panel 13 folds upon the finished face 11' of panel 11, exposing the finished side of 13' of panel 13 with the removable picture section 25 overlying the picture section or outline 26. The jacket is now complete, being closed on three sides and open on the side opposite the flap 14, as indicated at 27. The completely folded blank, as shown in Fig. 13, now passes to a pressure or sock roller, while being constantly held in its completely folded and approximately square condition, to assure proper adhesion of the glue sections 18, 19, 20, 21 to the outer portions of face 11' of middle panel 11.

The finished jackets then move into a pressure or canvas device which stacks one or more of such jackets into a pressure section for final drying.

If a person desires to remove the picture section 25, it is a simple matter to lift a corner of section 25 by passing the point of a knife along the tear outline 24 and then lifting picture section 25 gently along tear lines 24. To facilitate such removal of picture section 25, a starter tab 28 may be provided, as shown in Fig. 14, which may be easily lifted by a finger nail to start removing the picture section 25 along tear lines 24.

When picture section 25 is removed, the picture or printing within the section 26 of middle panel 11 is exposed and the appearance of the jacket is not substantially altered and its usefulness is not destroyed.

While specific embodiments of the invention and method of making the jacket have been shown and described in detail to illustrate the application of the invention principles, it will be understood that the invention and the method of making the jacket may be altered without departing from the general spirit of the invention.

What is claimed is:

1. A substantially square phonograph record jacket having three closed sides and an open side for inserting a phonograph record, said jacket having front, middle and rear panels, said inner and outer flaps being on the same edge and on a closed side of said jacket, an inner flap extending from one of said panels, an outer flap extending from another of said panels, said inner and outer flaps extending in the same direction from two of said panels, said front panel having a removable section therein defined by a perforated tear outline, said inner flap glued to one of said panels at a closed edge, said middle panel having a printed section, said front panel having all its marginal edges only adhered to the marginal edges of said middle panel outside of said tear outline, said removable section being free of adherence to said middle panel for bodily detachment from said jacket by tearing along said tear outline, said removable section overlying said printed section of said said middle panel and said outer flap glued to said rear panel at a closed edge.

2. A phonograph record jacket as claimed in claim 1 in which the outer surface of said removable section is imprinted with a picture of the recording artist or artists.

3. A phonograph record jacket as claimed in claim 1 in which said printed section extends marginally beyond said tear outline.

4. A phonograph record jacket as claimed in claim 1 in which said printed section is imprinted with the same imprinting as the outer surface of said removable section.

5. A substantially square phonograph record jacket having three closed sides and an open side for inserting a phonograph record, said jacket having front, middle and rear panels, said panels being substantially square and of equal size, an inner flap extending from said middle panel, an outer flap extending from said front panel, said inner and outer flaps being on the same edge of said middle and front panels, respectively, and on a closed side of said jacket, said front panel having a removable section therein defined by a perforated tear outline, said inner flap glued to said middle panel at a closed edge, said middle panel having a printed section, said front panel having all its marginal edges only adhered to the marginal edges of said middle panel outside of said tear outline, said removable section being free of adherence to said middle panel for bodily detachment from said jacket by tearing along said tear outline, said removable section overlying said printed section of said middle panel, and said outer flap glued to said rear panel at a closed edge whereby when said removable section is detached from said front panel said printed section of said middle panel is exposed.

6. An article of manufacture comprising a blank which is adapted to be folded to form a substantially square phonograph record jacket having three closed sides and an open side for inserting a phonograph record, said blank comprising a cardboard sheet having crease lines defining a front, middle and rear panels, an inner flap extending from one of said panels, an outer flap extending from another of said panels, said inner and outer flaps being on the same edge and on a closed side of said jacket and a perforated tear outline on said front panel defining a removable section, said panels being substantially square and of equal size, said inner flap adapted to be reversely folded and adhered to one of said panels at a closed edge, said middle panel having a printing section, said front panel adapted to be folded upon said middle panel and having all its marginal edges only adhered to the marginal edges of said middle panel outside of said tear outline, said removable section being free of adherence to said middle panel for bodily detachment from said jackets by tearing along said tear outline, said removable section overlying said printing section of said middle panel, said outer flap adapted to be reversely folded and adhered to said rear panel at a closed edge, and said middle panel adapted to be folded upon said rear panel providing a space therebetween for a phonograph record.

7. An article of manufacture comprising a blank which is adapted to be folded to form a substantially square phonograph record jacket having three closed sides and an open side for inserting a phonograph record, said blank comprising a cardboard sheet having crease lines defining a front, middle and rear panels, an inner flap extending from said middle panel, an outer flap extending from said front panel and a perforated tear outline section defining a removable section, said panels being substantially square and of equal size, said inner flap adapted to be reversely folded and adhered to said middle panel at a closed edge, said middle panel having a printing section, said front panel adapted to be folded upon said middle panel and having all its marginal edges only adhered to the marginal edges of said middle panel outside of said tear outline, said removable section being free of adherence to said middle panel for bodily detachment from said jacket by tearing along said tear outline, said removable section overlying said printing section of said middle panel, said outer flap adapted to be reversely folded and adhered to said rear panel at a closed edge, and said middle panel adapted to be folded upon said rear panel providing a space therebetween for a phonograph record.

References Cited in the file of this patent

UNITED STATES PATENTS

| | | |
|---|---|---|
| 1,897,847 | Kennedy | Feb. 14, 1933 |
| 2,005,135 | Esterson | June 18, 1935 |
| 2,096,960 | Colby | Oct. 26, 1937 |
| 2,333,798 | Kner | Nov. 9, 1943 |
| 2,636,312 | Martin | Apr. 28, 1953 |
| 2,827,223 | Allison | Mar. 18, 1958 |

FOREIGN PATENTS

| | | |
|---|---|---|
| 934,095 | Germany | Sept. 15, 1955 |